Feb. 25, 1941.  J. B. CLAFFEY  2,232,840
DISTILLATION CONTROL
Filed Feb. 24, 1938  2 Sheets-Sheet 1

INVENTOR
Joseph B Claffey
BY
Hugo G Kemman
ATTORNEY

Feb. 25, 1941.   J. B. CLAFFEY   2,232,840
DISTILLATION CONTROL
Filed Feb. 24, 1938   2 Sheets-Sheet 2

INVENTOR
Joseph B Claffey
BY
Hugo G Kenman
ATTORNEY

Patented Feb. 25, 1941

2,232,840

UNITED STATES PATENT OFFICE 2,232,840

DISTILLATION CONTROL

Joseph B. Claffey, Philadelphia, Pa., assignor to The United Gas Improvement Company, a corporation of Pennsylvania Application February 24, 1938, Serial No. 192,197

8 Claims. (Cl. 202—72)

This invention pertains generally to distillation and pertains particularly to distillation with high efficiency of separation and high throughput.

It has been found that the efficiency of separation and throughput of fractionating columns in general, and packed columns in particular, are closely associated with conditions which cause flooding of the columns in that highest efficiencies with highest throughput are obtained just below the flooding point.

Flooding is caused by excessively high vapor velocities which tend to prevent the countercurrent flow of reflux liquid thus causing reflux liquid to build up in the column and fill its entire space, hence the term "flooding." A result of flooding is a sharp decrease in efficiency and throughput and a sharp increase in pressure drop through the column.

Vapor velocities are a function of the rate of vapor generation in the still pot, and it is by a close control of the rate of vapor generation, through means responsive to the pressure drop, that I am able to continuously operate throughout a distillation, whether batch or continuous, with highest efficiencies and throughputs.

Other features of the invention reside in the construction, arrangement and combination of parts, and in the steps, combinations of steps, and sequences of steps, all of which, together with other features, will become more apparent to persons skilled in the art as the specification proceeds and upon reference to the drawings in which.

Figure 1:
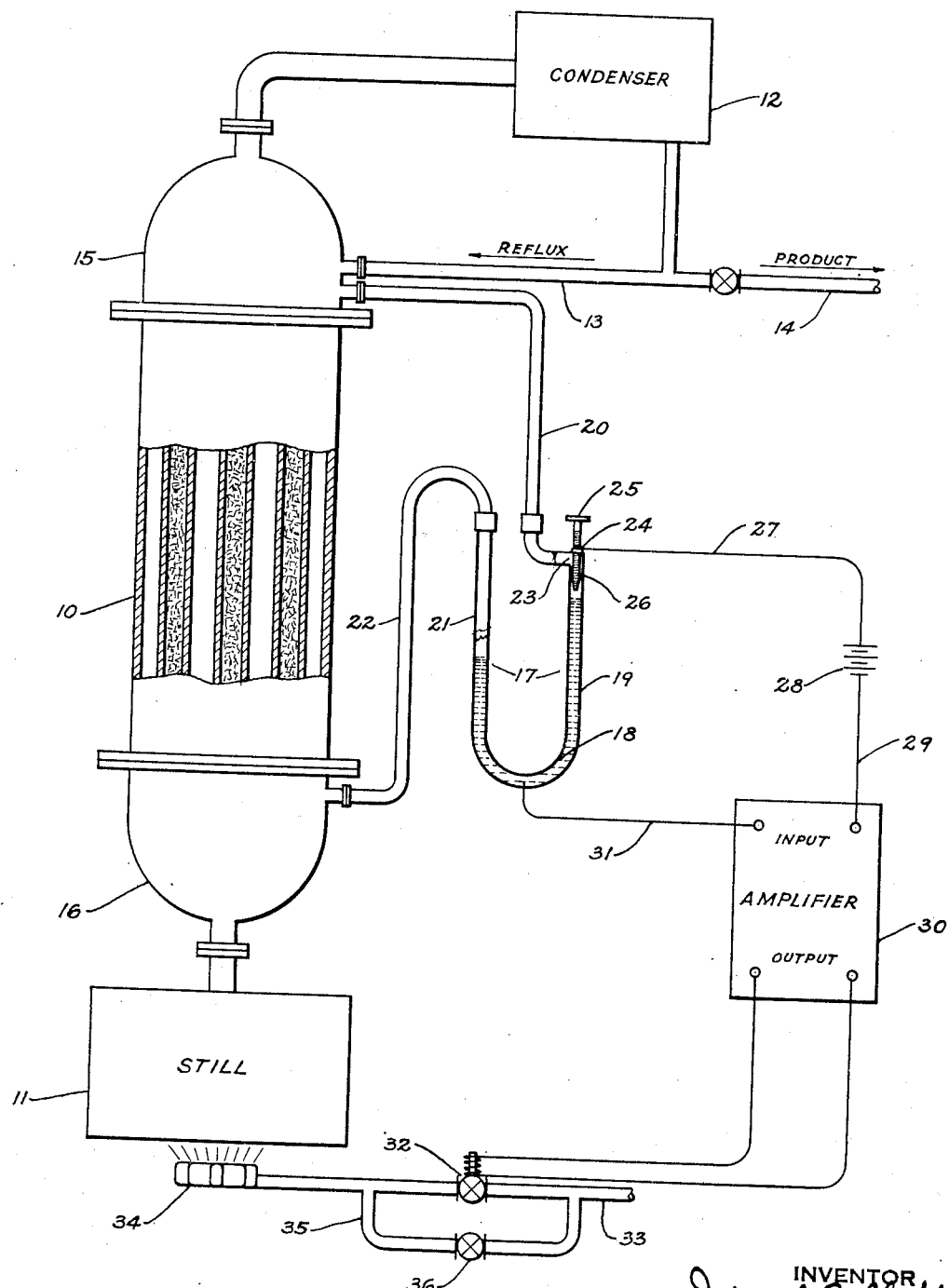
Figure 1 is an elevation, partly in section and partly diagrammatical, illustrating one form of the invention.

Referring now more particularly to Figure 1 at 10 is shown a column which has been represented as being of the multi-tubular packed type. Tubular columns usually comprise a plurality of tubes connected in parallel and packed with a suitable phase contacting medium, although single tube packed columns are frequently used. While the invention is particularly adapted to tubular packed columns, it is also applicable to distillation columns in general including those of the bubble cap type.

At 11 is conventionally represented a still for column 10, and at 12, a condenser with reflux and product lines 13 and 14 respectively.

The apparatus so far particularly described may be conventional in character and may be of any design or construction known in the art. Likewise it may be operated in any desired manner or for any desired purpose.

In the operation of column 10 the pressure drop from the bottom to the top, or in other words between chambers 16 and 15, will vary with the vapor velocity up through the column, increasing with increase in vapor velocity up to the flooding point. When the flooding point is reached the pressure drop increases very sharply.

Vapor velocity is determined by the pressure in still 11, which in turn is determined by the rate of vapor generation or, in other words, the heat input.

In accordance with this invention, I vary the heat input at still 11 with variation in pressure drop, decreasing the heat input when the pressure drop approaches a flooding value and increasing the heat input when it falls below this value.

Thus the operation of the column is kept in the neighborhood of incipient flooding without actually going into a flooding state.

As a result maximum efficiencies and throughputs are obtained.

While the means for causing the heat input at still 11 to vary with the pressure drop may be of any construction suitable for the purposes, I find it convenient to employ a U tube 17 partly filled with mercury 18 and having one arm 19 connected to chamber 15 as illustrated at 20 and another arm 21 connected to chamber 16 as illustrated at 22.

Arm 19 is shown with a set-off portion 23 through the wall of which extends internally threaded boss 24 which in turn accommodates an externally threaded adjustable element 25 having an end 26 extending downwardly into arm 19.

End 26 is connected through boss 24 and wire 27 to one side of a source of electrical energy 28, the other side of which is connected through wire 29 to one terminal of the input of an amplifier 30. The other input terminal of amplifier 30 is connected through wire 31 to mercury 18 in U tube 17.

The output of amplifier 30 is connected to a solenoid valve 32 in line 33, leading to heating element 34. Line 33 might carry steam, liquid or gaseous fuel or other heating medium, heating element 34 being accordingly chosen and positioned with respect to still 11 for the utilization of the selected heating medium.

Electrical heating means is regarded as an equivalent in which case line 33 is an electrical circuit, heating element 34 is of the electrical type or is electrically controlled such as an oil or tar burner, or solid fuel burner, or a blower, and valve 32 is an electrically operated switch, rheostat or the like.

When a fluid heating medium is employed it is convenient to provide a by-pass 35 around valve 32, flow through said by-pass being controlled by a valve 36.

The operation of the form of the invention shown in Figure 1 is as follows:

The still, column and conventional appurtenances being in operation, the height at which the mercury 18 will stand in arm 19 will be determined by the difference in pressure between chambers 16 and 15, or in other words the drop in pressure from chamber 16 to chamber 15. This height will increase and decrease with increase and decrease in such pressure drop.

Element 25 is so adjusted as to bring end 26 to a position in arm 19 such that it will be contacted by the rise of mercury in arm 19 when the pressure drop reflects flooding or incipient flooding conditions.

A circuit is thus closed through the input of amplifier 30 causing current to flow through its output circuit to operate valve 32 to completely shut off, or to decrease the flow of or otherwise regulate, heating medium in line 33 as desired or found convenient or necessary.

The heat input to still 11 is thus decreased, reducing vapor generation and in turn vapor velocity.

With restoration of a desired pressure drop the mercury in arm 19 will fall to break the circuit through the input of amplifier 30 whereupon its output circuit will be deenergized and valve 32 will again open.

Valve 32 is preferably of such capacity when fully open as to send more heating medium to heating element 34 than is normally required, a condition which would cause the column 10 to flood except for the control mechanism herein provided. The repeated momentary closing, or partial closing (according to the type of valve chosen) of valve 32 cuts down the flow of heating medium to the exact amount necessary for most efficient operation.

When by-pass 35 is employed valve 36 is adjusted so that the flow of heating medium through the by-pass is slightly less than required for normal operation. In this case valve 32 controls the flow of the additional heating medium required. This arrangement has the effect of preventing large surges in flow of heating medium.

It will, of course, be understood that the connections to the column might be reversed so that the mercury will descend in arm 19 with increase in pressure drop. In this case breaking of the circuit through the amplifier will close valve 32. Valve 32 in this case will be of a type that closes when not energized.

While I have particularly described an embodiment of my invention it is to be understood that this is not by way of limitation and that other forms are possible.

Figure 2:
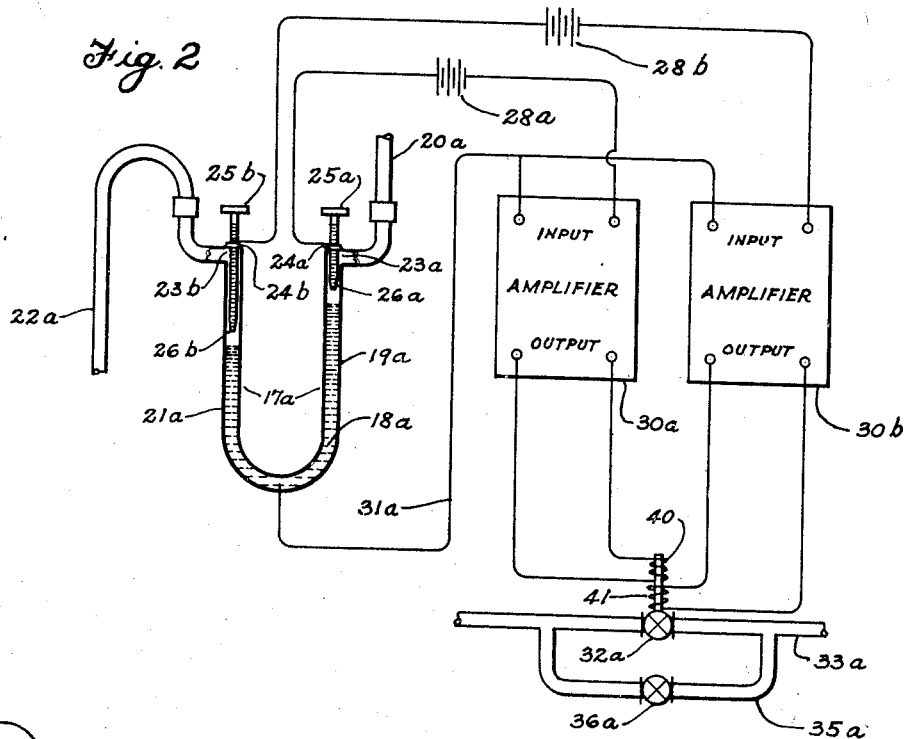
Figure 2 is an elevation, shown broken and partly diagrammatical, illustrating another form of the invention.

This is illustrated in Figure 2 wherein a modified U tube 11a is provided with set off portions 23a and 23b in arms 19a and 21a respectively, the latter being connected to the upper and lower chambers of a column in the same manner as arms 19 and 21 of Figure 1.

Adjustable elements 25a and 25b and appurtenances are in all respects similar to adjustable element 25 of Figure 1.

Boss 24a is connected to one terminal of the input of an amplifier 30a through a source of electrical energy indicated generally at 28a, the other terminal of the input being connected to mercury 18a through wire 31a.

Boss 24b is connected to one terminal of the input of an amplifier 30b through a source of electrical energy indicated generally at 28b, the other terminal of the input being connected to mercury 18a through wire 31a.

The output of amplifier 30a is connected to operating coil 40 of solenoid valve 32a.

The output of amplifier 30b is connected to operating coil 41 of solenoid valve 32a.

The arrangement is such that valve 32a has an intermediate opening for the flow of heating medium when neither of its operating coils 40 and 41 is energized.

When the mercury in arm 19a rises, due to an excessive pressure drop, to contact end 26a and close a circuit through the input of amplifier 30a, coil 40 is energized and valve 32a closes either partially or completely (according to its design) to cut down the heat input into the still.

The result is a reduction in pressure drop.

As the desired pressure drop is restored the mercury in arm 19a will fall below end 26a to break the circuit and valve 32a will return to its intermediate position.

Should the pressure drop fall below the desired point, the mercury 18a will rise in arm 21a to contact terminal 26b and close a circuit through the input of amplifier 30b. This will energize coil 41 to open valve 32a beyond its normal setting, permitting an increase in flow of heating medium. This will increase the heat input into the still.

The result is an increase in pressure drop.

As the desired pressure drop is restored the mercury in arm 21a will fall below end 26b to break the circuit and valve 32a will return to its intermediate position.

By a careful adjustment of adjustable elements 25a and 25b the pressure drop may be held between more or less definitely defined limits.

By-pass 35a with valve 36a may be provided if desired.

Other modifications are possible without departing from the broad concept of the invention.

Figure 3:
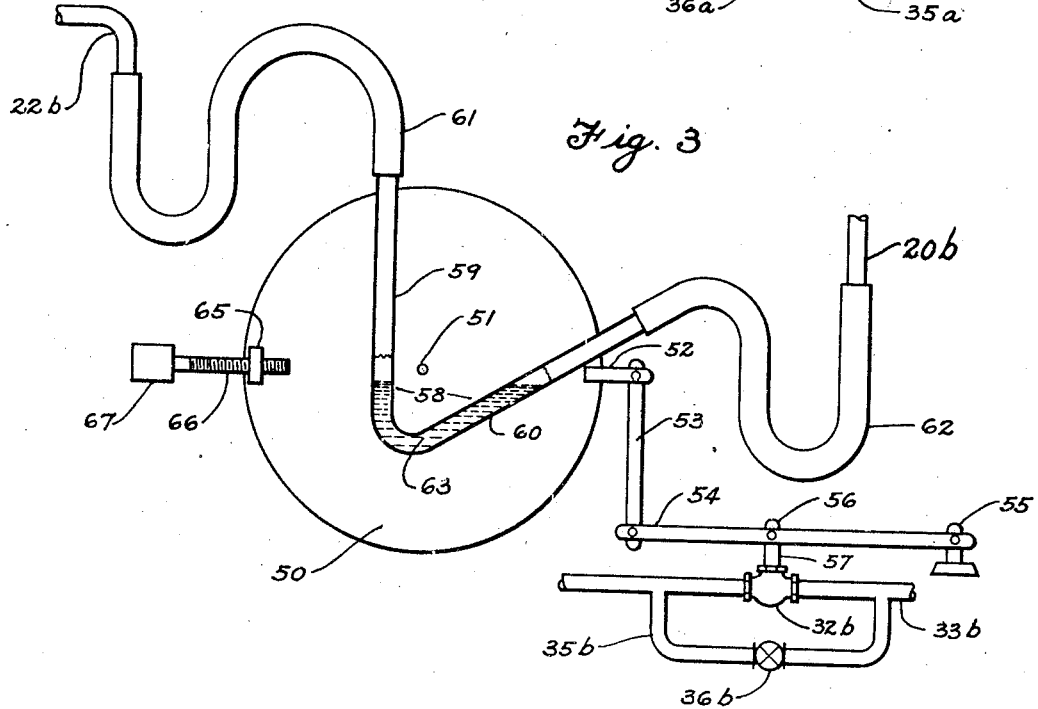
Figure 3 is an elevation, shown broken and partly diagrammatical, illustrating a third form of the invention.

This is illustrated in Figure 3 wherein valve 32b in line 33b, which conducts heating medium, is opened and closed mechanically instead of electrically.

Briefly, the arrangement shown in Figure 3 comprises a disc 50, axially mounted so as to be rotatable about its center 51. A member 52 fixed to disc 50 extends beyond the periphery thereof and is connected through link 53 to lever 54 fulcrumed at 55 and pivotally connected at 56 to control member 57 of valve 32b.

Control member 57 is of the type that opens and closes valve 32b with upward and downward motion respectively, although any other type of valve or regulating mechanism might be substituted, the necessary mechanical changes being well within the skill of persons skilled in the art.

Mounted on the face of disc 50 is a tube 58 bent more or less in a V and arranged so that one arm 59 is more or less vertical and the other arm 60 slopes upwardly.

Arm 59 is connected through a flexible element 61, which may be a rubber tube, to line 22b which leads to chamber 16 of Figure 1.

Likewise arm 60 is connected through a flexible element 62, which may be a rubber tube, to line 20b which leads to chamber 15 of Figure 1.

Tube 58 contains a liquid such as mercury illustrated at 63.

An adjustable device, comprising internally threaded member 65 fixed to disc 50 and externally threaded member 66 having a weight 67 at its end, and threadedly engaging member 65 is arranged on disc 50 opposite member 52 and functions as a counterbalance.

The operation of the device shown in Figure 3 is as follows:

It will be understood that mercury 63 ascends and descends in arm 60 with increase and decrease in pressure drop through the column across which tube 58 is connected.

When disc 50 rotates clockwise, as the result of mercury rising in arm 60, valve 32b closes (partially or totally according to design) to decrease the flow of heating medium.

When disc 50 rotates counter-clockwise, as the result of mercury descending in arm 60, valve 32b opens to increase the flow of heating medium.

By screwing member 66 in and out of member 65 weight 67 is adjusted radially with respect to axis 51. Thus the device shown in Figure 3 may be adjusted to trip at any desired pressure drop to operate valve 32b.

It will be understood that tube 58 may be of any diameter so that any desired volume and thus weight of mercury may be caused to ascend and descend in arm 60 as required to operate valve 32b and associated mechanism.

It is, of course, to be understood that the pressure drop through any part of the column may be employed in place of the drop through the entire column if desired.

Furthermore, it will be seen that by adjustment of element 25, or elements 25a and 25b, or element 66, as the case may be, it is possible to employ my invention to operate columns with any desired pressure drop other than the preferred pressure drop more particularly referred to herein.

Having set forth and particularly described several embodiments of my invention, it is to be understood that this is by way of illustration, and that changes, omissions, additions, substitutions, and/or modifications might be made within the scope of the claims, without departing from the spirit of the invention which is intended to be limited only as required by the prior art.

I claim:

1. Apparatus for the fractionation of a fluid mixture containing components of different volatilities, comprising a column for the counter-current contact of ascending vapor phase with descending liquid phase, means for generating said vapor phase, and means connected to said column at vertically spaced points and actuated by difference in pressure between said points for controlling said first mentioned means.

2. Apparatus for the fractionation of a fluid mixture containing components of different volatilities, comprising a column for the counter-current contact of ascending vapor phase with descending liquid phase, a still for said column, heating means for said still, and means connected to said column at vertically spaced points and actuated by difference in pressure between said points for controlling said heating means in a manner to decrease and increase the heat input into said still with increase and decrease respectively in said difference in pressure.

3. Apparatus for the fractionation of a fluid mixture containing components of different volatilities, comprising a column having a packed phase contacting section for the counter-current contact of ascending vapor phase with descending liquid phase, means for generating said vapor phase, means actuated by differential pressure connected to said column at vertically spaced points, said points having at least a portion of said phase contacting section therebetween, and means for controlling said first mentioned means through said second mentioned means to decrease and increase the rate of vapor phase generation by said first mentioned means with increase and decrease respectively in said differential pressure.

4. Apparatus for the fractionation of a fluid mixture containing components of different volatilities, comprising a column for the counter-current contact of ascending vapor phase with descending liquid phase, means for generating said vapor phase, and means actuated by difference in pressure between vertically spaced points in said column for controlling said first mentioned means to maintain the rate of vapor phase generation below that which would cause flooding.

5. Apparatus for the fractionation of a fluid mixture containing components of different volatilities, comprising a multi-tubular column for the counter-current contact of ascending vapor phase with descending liquid phase, a still for said column, heating means for said still, and means actuated by difference in pressure between vertically spaced points in said column for controlling said heating means.

6. Apparatus for the fractionation of a fluid mixture containing components of different volatilities comprising a column for the counter-current contact of ascending vapor phase with descending liquid phase, a still for generating said vapor phase, heating means for said still, and means actuated by difference in pressure between vertically spaced points in said column for controlling said heating means and thereby the generation of said vapor phase to maintain the rate of generation of vapor phase immediately below that which would cause flooding.

7. In a process for the fractionation of a fluid mixture containing components of different volatilities wherein ascending vapor phase is counter-currently contacted with descending liquid phase in a phase contacting path, the step of utilizing difference in pressure between vertically spaced points along said phase contacting path to control the rate of generation of said vapor phase.

8. In a process for the fractionation of a fluid mixture containing components of different volatilities wherein ascending vapor phase is counter-currently contacted with descending liquid phase in a phase contacting path, the step of utilizing difference in pressure between vertically spaced points along said phase contacting path to control the rate of generation of said vapor phase to maintain the rate of generation near incipient flooding and to decrease the rate of vapor phase generation when said rate is sufficient to cause flooding.

JOSEPH B. CLAFFEY.